United States Patent [19]
Martinez

[11] Patent Number: 5,404,734
[45] Date of Patent: Apr. 11, 1995

[54] SECURE LOCKING ARRANGEMENT

[76] Inventor: Louis Martinez, 3521 Summerdale St., Corona, Calif. 91719

[21] Appl. No.: 20,197

[22] Filed: Feb. 19, 1993

[51] Int. Cl.⁶ .................... E05B 67/36; F16K 35/10
[52] U.S. Cl. ............................................. 70/34; 70/39;
 70/129; 70/177; 70/180; 70/212; 137/285;
 292/148
[58] Field of Search ................................. 70/54–56,
 70/33, 34, 386, 39, 129, 211, 212, 175–180;
 292/148; 137/385

[56] References Cited

U.S. PATENT DOCUMENTS

| | | | |
|---|---|---|---|
| 1,257,322 | 2/1918 | Cunningham | 70/177 |
| 1,359,729 | 11/1920 | Nichols | 70/211 |
| 1,368,711 | 2/1921 | Foley | 292/148 |
| 1,414,991 | 5/1922 | McKeage | 70/211 |
| 1,424,543 | 8/1922 | Wiloch | 70/39 |
| 2,794,663 | 6/1957 | Grodt et al. | 292/148 X |
| 3,334,933 | 8/1967 | Ehlers | 70/129 |
| 3,652,114 | 3/1972 | Cady et al. | 70/56 X |
| 3,655,229 | 4/1972 | Tumbiolo | 292/148 |
| 3,668,906 | 6/1972 | Josephart | 70/90 |
| 3,721,112 | 3/1973 | Wellekens | 70/39 |
| 3,726,115 | 4/1973 | Wellens | 70/33 |
| 3,763,675 | 10/1973 | Hofmeister et al. | 70/34 X |
| 3,769,821 | 11/1973 | Randel | 70/33 |
| 4,031,726 | 6/1977 | De Jager | 70/259 X |
| 4,185,860 | 1/1980 | Bondi | 70/129 X |
| 4,616,493 | 10/1986 | Fazzolari et al. | 70/129 |
| 4,861,079 | 8/1989 | DeForrest, Sr. | 292/148 |
| 4,883,294 | 11/1989 | Goodspeed | 292/148 |
| 5,127,244 | 7/1992 | Myers | 70/34 X |

*Primary Examiner*—Lloyd A. Gall
*Attorney, Agent, or Firm*—Beehler & Pavitt

[57] ABSTRACT

A lock comprised of a cylindrical body having a first passage extending axially through the body which passage is configured to enable a locking bar to be passed through the body, the bar having at least one orifice intermediate its extremities, the lock body having a second partial passageway extending from the side wall of the body at least into the first passageway and normal to the latter so that the orifice in the bar can be disposed in register with the second passageway. A cylindrical lock configured to fit slidably in the second passageway so that at least a portion of the lock may be thrust in the second passageway and through the bar orifice when the latter is disposed in register with the second passageway, when the lock may be secured by a key to be withdrawn from the outer end of the lock. This lock and bar may employed with external plates to secure adjacent members from movement relative to each other.

7 Claims, 3 Drawing Sheets

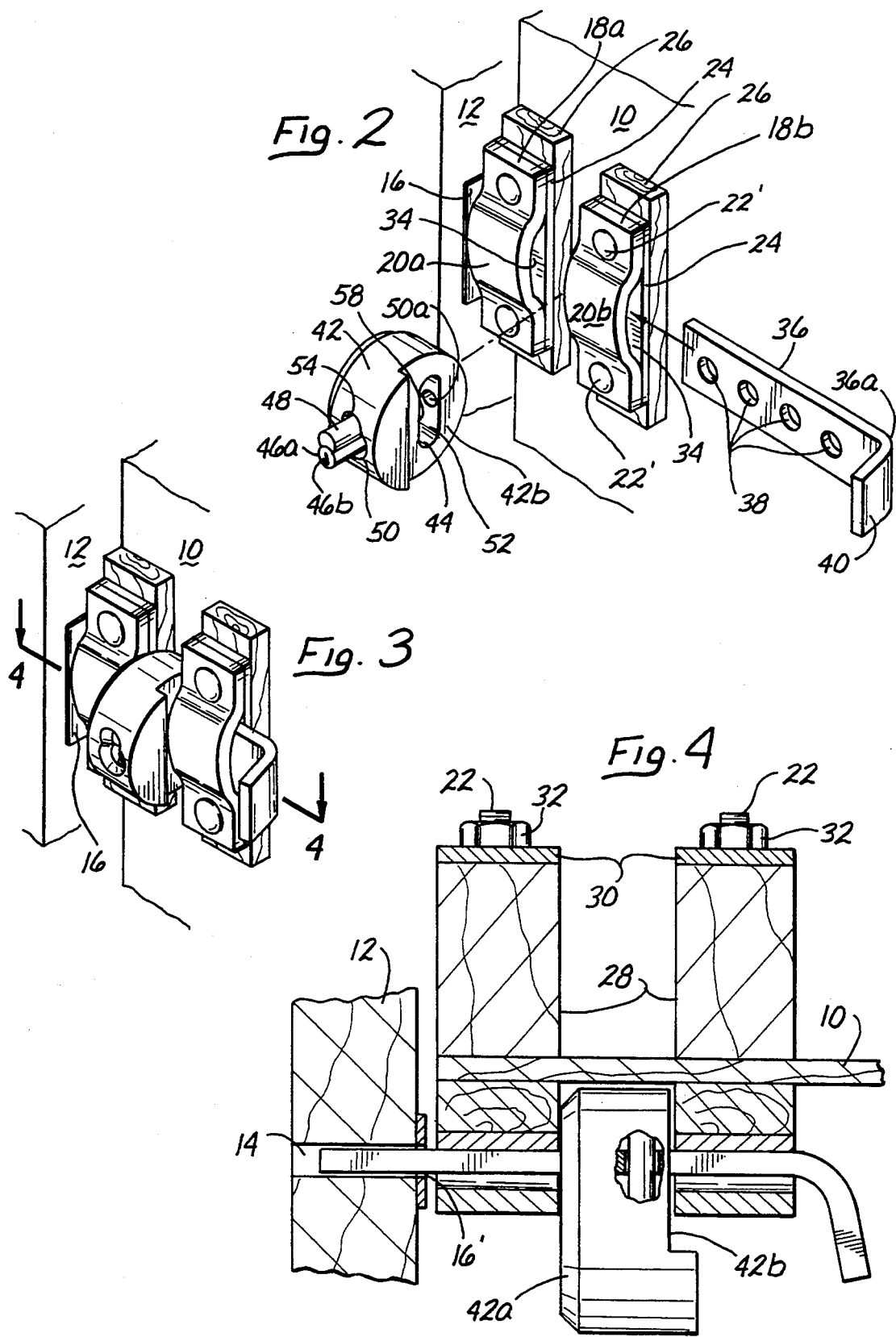

SECURE LOCKING ARRANGEMENT

FIELD OF THE INVENTION

This invention relates generally to the field of locking arrangements and, particularly, to an arrangement which uses a solid locking body in place of a padlock with a U-shaped link.

BACKGROUND OF THE INVENTION

DESCRIPTION OF THE PRIOR ART

Securing doors and other movable members against opening or other movement by means of external locking devices has been accomplished in innumerable way since, at least, as far back as Elizabethan times, if not earlier. Among the many ways this has been accomplished have been the use of staples secured to a movable or stationary member and a hasp which fits over the staple and is prevented from removal from the staple by means of some type of padlock. In addition, various bar devices have been employed where the bar members are passed through some type of looped element extending outwardly from the adjacent members, such as a door and a door jamb, the relative movement between which members it is desired to prevent. Examples of these latter arrangements may be seen in the U.S. Pat. Nos. to Foley, 1,368,711; Grodt et al., 2,794,663; Ehlers, 3,334,933; Tumbiolo, No. 3,655,229; Fazzorali, No. 4,616,493; DeForrest, 4,861,079 and Goodspeed, 4,883,294. In all of these arrangements, however, it may be possible either to remove from the member, by unscrewing or unbolting the bar-type receiving element, and in all instances, some type of pad lock is utilized to lock the bar. However, because of exposure of the U-shaped link in the padlock in most instances, such link may be cut, either by heavy wire cutters or sawed apart by some type of saw, the teeth of which can be brought against the U-shaped link.

In more recent years, there has been developed a type of cylindrical body lock which has a pair of opposed parallel faces normal to the cylinder axis in one of which faces an element receiving first passageway is provided. This first passageway extends normally to the cylinder face in which it is cut or molded and part way through the body towards the opposing cylinder face. In addition, a second passageway is bored in transversely from a side wall of the body to intersect perpendicularly, and even extend past the first passageway further into the cylindrical body. A cylindrical lock is slideably inserted into the second passageway, with this lock being provided with a co-axial plunger which, when a key is inserted in the lock member and pushed, will extend through the first passageway and in toward the end of the second passageway. Thus, if two orificed members which are to be held together are inserted in the first passageway and their orifices are co-aligned with the locked plunger, when the lock is pushed into the second passageway so that its plunger passes through the orifices, and the lock is secured in the second passageway and the key removed, it is impossible to remove the lock from the two members, short of destroying the members themselves. This type of lock is disclosed in U.S. Pat. No. 3,769,821, issued to Mortimer A. Randel, where its use is shown for securing the door of a coin operated vending machine. Locks of this type have been manufactured by American Lock Company.

While such cylindrical locks have been found to be effective for the purpose for which they have been designed, their use hitherto has been limited to securing at their ends a pair of flat bars or angle flanges which are attached to doors and frames, the relative movement between which is to be prevented. Such cylindrical locks have not heretofore been utilizable to secure bars across doors, or a door and a jamb or building frame; nor have such locks heretofore available been utilizable to secure pressure valves against tampering or other unauthorized opening, closing or valve settings.

SUMMARY OF THE INVENTION

The present invention involves the modification of the conventional cylindrical lock by cutting through the lock body to extend the first passageway completely through the body. By so doing, a bar element may be passed through the first passageway, and when provided with one or more orifices, the bar may be secured against any movement relative to the locked body.

It is also a feature of the present invention to utilize a thus modified cylindrical lock body with an orificed bar to secure doors, valves and other movable members in fixed positions. Where it is desired to secure two doors together, or a door against a frame, a pair of plate-like elements having outwardly convexed central portions and spaced from each other may be provided and mounted by round head bolts passed through the ends of the elements and the door or frame, with the elements being spaced apart by the axial length of the lock body. When the lock is interposed in said space and its axially cut through passageway coaligned with the convex central portions of the elements; if an orificed bar is passed through both central portions and the lock body's first passageway and the locked plunger is thrust through the bar orifice and the lock locked in the body, a most secure arrangement results.

In another embodiment of the invention for securing a pressure valve, if a portion of the lock, offset from the first passageway is welded to a member, such as a valve plate or ring, and an orificed hooked bar is brought down over the valve wheel and passed through the first passageway in the cylindrical lock body, when the lock plunger is pushed through the orifice in the bar, and secured by turning a key and removing it from the slidable inner lock, turning of the wheel valve control may be effectively prevented.

The modified locked body and the locking arrangements of the present invention, thus, may have many applications more effectively to secure adjacent members from being moved relative to each other.

IN THE DRAWINGS

In the accompanying drawings,

FIG. 2 is a perspective view of an arrangement of the lock and elements for securing a door against movement relative to a wall or door jamb, in a position with the lock moved away from the door and the bar removed from the securing position.

FIG. 3 is a perspective view similar to FIG. 2, but showing the manner in which the lock and bar of FIG. 2 are brought together to accomplish the securing of the door in the frame.

FIG. 4 is an enlarged sectional view taken on the line 4—4 of FIG. 3, in the direction of the arrows.

DESCRIPTION OF THE PREFERRED EMBODIMENT

Figure 1:
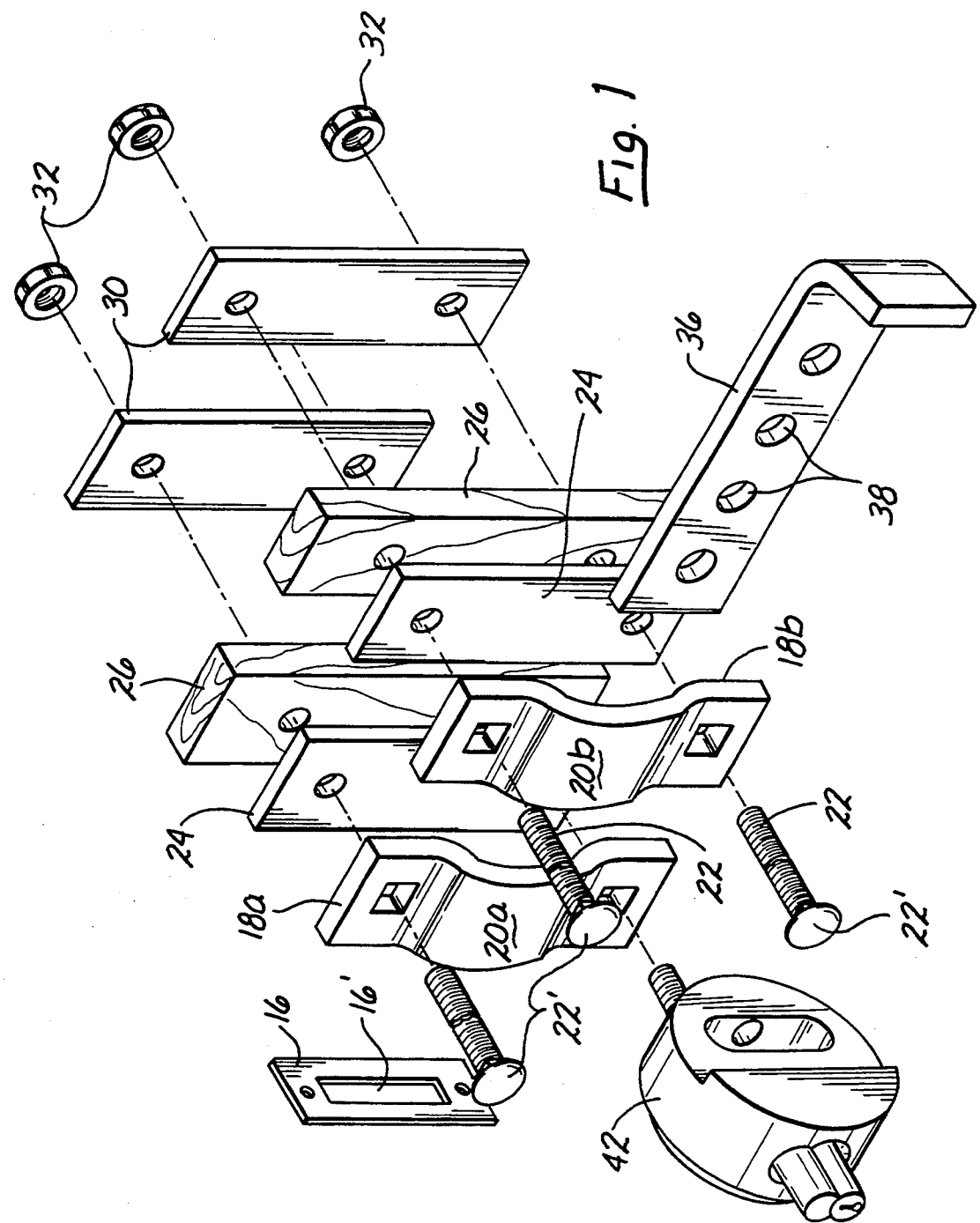
FIG. 1 is an exploded perspective view of the lock and other elements which could be employed to secure a door against relative movement with a wall or door jamb, as shown in FIG. 2.

Referring to the embodiment of the invention shown in FIGS. 1-4 of the drawings, the object of the locking arrangement illustrated is to enable a door 10 to be secured in position against a door jamb or wall 12. To accomplish this objective, the wall 12 is provided with a rectangular recess 14 capped by a metallic front plate 16 having an opening conforming 16' to the cross section of the recess. The door 10 has secured to it a pair of metal plates 18a, 18b, each of which is centrally convexed at 20a and 20b, respectively, and secured to the door 10 by a pair of metal bolts 22 through a metal plate 24 and a mounting block 26 on the outside of the door 10 and by mounting blocks 28 on the inside of the door 10. Each of the bolts 22 has a round head 22' to prevent removal or tampering with the bolt on the outside of the door and is secured on the inside of the door by plates 30 and nuts 32. Because of the convexities 20a and 20b of the plates 18a and 18b, respectively, when mounted against the flat plates 24, an opening 34 is defined through which opening a rectangular bar 36 may be passed when both openings 34 are co-aligned in register. When this co-alignment is also in register with the recess 14, it will be appreciated that the bar 36 may be passed, not only through both openings 34, but also through the capping plate 16 and into the recess 14.

The bar 36 is provided with at least one, and preferably, a plurality of transverse openings 38, the object of which will be later explained. In addition, the end 36a of the bar 36 may be bent outwardly to provide something in the nature of a handle for sliding the bar through the openings 34 and further into the recess 14. It may be seen then, that, when the bar 36 is thus passed through the openings 34 and into the recess 14, relative movement between the door 10 and the jamb or wall 12, is prevented. Obviously, however, when the bar is withdrawn from the recess 14, the door 10 may be moved inwardly or outwardly with respect to the jamb 12, depending upon the door hinge arrangement (not shown).

To secure the bar 36 in the recess 14, the present invention utilizes a cylindrical type lock 42, and spaces the plates 18a and 18b and their respective mountings apart laterally by a distance slightly greater than the altitude of the cylindrical lock 42. The particular lock shown in the drawings is one made by the American Lock Company, Model No. 2000. This lock is made with a recess which extends inside from the face 42a, but terminates before reaching the opposite face 42b. The present invention, however, modifies this lock to extend its normal recess completely through the face 42b to provide a through passageway 44.

The actual locking mechanism comprises a lower cylinder plunger 46 the outer end 46a of which is provided with a key receiving slot 46b. Attached to the upper portion of the cylinder plunger 46 is a shorter slideable partial cylinder 48. The cylinder 46 is slideable in a bore 50 which intersects the passage way 44 and has a short extension 50a into the side wall 52 which partially defines the passageway 44. A second shorter bore 54, parallel to bore 50, extends only partially into the side wall 56 of the lock 42, terminating before its reaches the wall 58 opposite side wall 52 defining the passageway 44. The actual locking mechanism shown in the drawings constitutes no part of the present invention and a different type of cylindrical lock, such as that shown in the Randel Patent No. 3,769,821 could be modified in the same manner as that of the American Lock Company Lock featured in the drawings.

In use, before the bar 36 is passed through the openings 34 between the plates 18a and 24, and 18b and 24, the lock is inserted between the mounted plates 18a and 18b and the lock passageway 44 is co-aligned in register with the openings 34 and the recess 14, with one of the holes 38 in the bar 36 being disposed in register with the bore 50 and its extension 50a. When the bar 36 is so disposed, with reference to the plates 18a, 18b and the recess 14, a key is inserted into the slot 46b and the cylinder 46 and its attachment 48 are pushed into the lock body 42 so that the cylindrical plunger 46 passes through the registering hole 38 in the bar 36 and into the bore extension 50a. As the lock cylinder 46 is moved into the lock body, the partial cylinder 48 follows into and to the extent of, the bore 54; whereupon turning of the key in the lock slot 46b results in securing the plunger 46 and its attachment 48 in the lock body, at which point the key (not shown) is removed. It will be appreciated, then, that the lock body 42, in conjunction with the bar 36 and the plates 18a, 18b and the recess 14, effectively secures the door 10 to the jamb 12.

Figure 5:
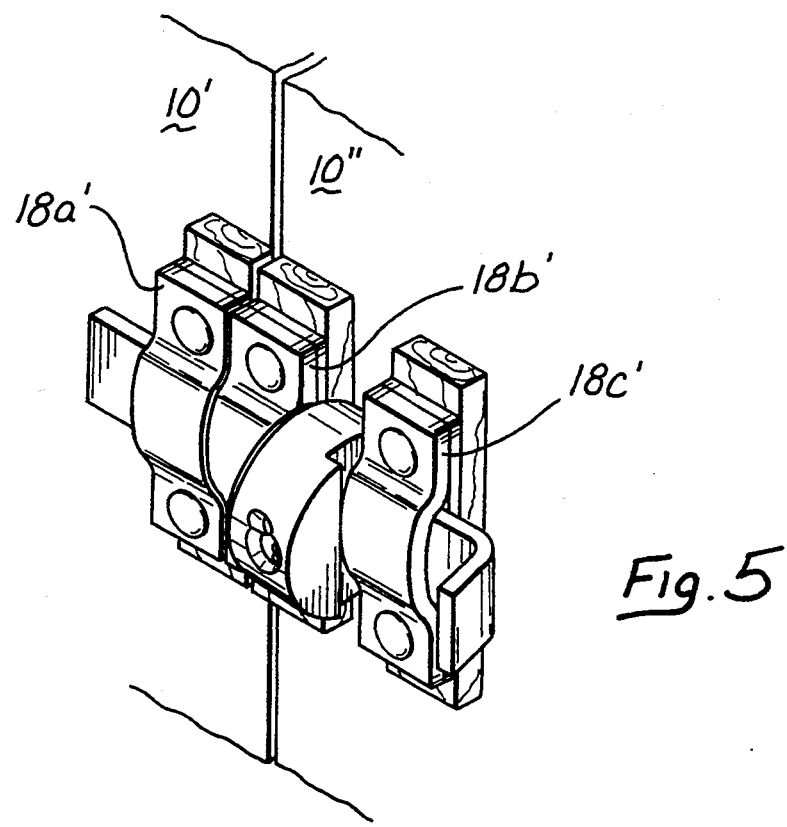
FIG. 5 is a perspective view of a further embodiment of the invention employed to secure together two abutting doors against movement relative to each other.

In the embodiment of the invention shown in FIG. 5, two abutting doors, 10' and 10" may be similarly effectively secured against movement relative to each other by mounting the plates 18a', 18b' and 18c' in the manner illustrated in FIG. 5 similarly to the mounting of the plates 18a and 18b as shown and discussed in connection with the embodiment of FIGS. 1-4 of the drawings. In this FIG. 5 embodiment, a similar lock 42' is disposed between plates 18b' and 18c' in the same manner as in the FIGS. 1-4 embodiment, and the additional plate 18a' is similarly mounted and serves as a substitute for the recess 14 in the FIGS. 1-4 embodiment. Its use would be similar to what has been discussed.

Figure 6:
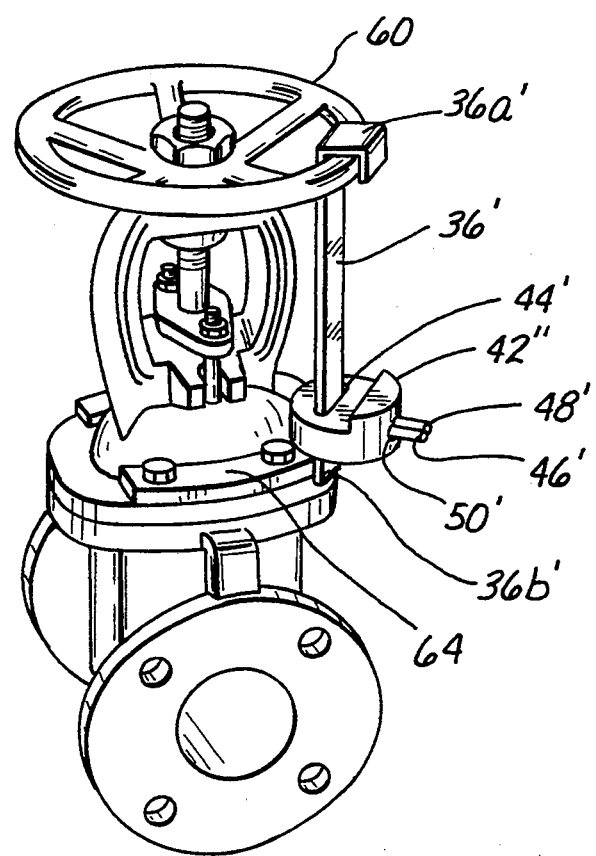
FIG. 6 is a perspective view of a gate valve secured by a bar passed through a lock of the type shown in FIG. 2.

In a quite different embodiment of the invention shown in FIG. 6, where the object is to enable a pressure valve wheel 60 to be secured against undesired rotation relative to the valve base 62, a lock 42" would be welded as at 63 to a plate 64 in such a manner as to allow the opening 44' to be sufficiently offset from the plate 64 so that a bar 36', when pushed through the opening 44', will clear the plate 64. In this application, any bar orifices (not shown) similar to orifices in FIGS. 1-4 embodiment 38 would be provided near the end 36b' of the bar 36' to enable such opening to be disposed in register with a lock bore (not shown), similar to the bore 56 shown in the FIGS. 1-4 embodiment.

In the FIG. 6 application of the present invention, it is desirable to have the bar 36' formed at its end 36a' with a U-shape so that one may not be able to pry it inwardly of the wheel 60. To secure the wheel 60, the bar 36' is dropped over the wheel 60 and its end 36b' passed through the opening 44' in the lock to where its opening (not shown) is in register with the lock bore 50' to enable the locking plunger 46' to be thrust through the hole in the bar 36' in the same manner as has been explained in connection with the FIGS. 1-4 embodiment.

It may be seen from the foregoing explanation of the modification of the currently available cylindrical locks and the locking arrangement disclosed that the present invention provides most effective security for preventing the movement of abutting or adjacent members from being moved relative to each other.

I claim:

1. A locking arrangement comprising:

a solid lock body, said body being defined by two opposite sides formed by parallel faces and a side wall extending between and around the perimeters of said faces, a first passageway extending through said body between, and normal to, said faces; a second passageway extending in from the side wall to transversely intersect the first passageway and a further predetermined axial extent beyond said first passageway into the lock body, an elongated element configured to fit closely, but slidably through said first passageway to extend beyond both of said faces its extremities with members to receive the extending extremities of said element and to be secured thereby, said elongated element having at least one orifice intermediate its extremities and co-alignable with the second passageway in the lock body when the element is disposed in the first passageway, an elongated lock secured in said second passageway of the lock body, said elongated lock including a plunger axially movable in said second passageway from a first position removed from the first passageway, to a second position extending through the first passageway and through said at least one orifice when said element has been disposed in said first passageway and its orifice is aligned with the second passageway, and into the further extent of the second passageway in said body; said elongated lock having a key receiving outer extremity and being operated by a key insertable into the last said extremity to move the plunger between its first position and its second position, in which second position the said elongated element is prevented from being moved within said first passageway, and upon turning the key and removing it from the key receiving extremity, the plunger is maintained in its second position, thereby to secure the said elongated element against any movement relative to the lock body and to the members receiving the extremities of the elongated element.

2. A locking arrangement comprising:

a solid lock body, said body being defined by two opposite sides formed by parallel faces and a side wall extending between and around the perimeters of said faces, a first passageway extending through said body between, and normal to, said faces, a second passageway extending in from the body wall to transversely intersect the first passageway to pass therethrough, an elongated element configured to fit closely, but slidably through said first passageway to extend beyond both of said faces for engagement of its extremities with members to receive the extending extremities of said element and to be secured thereby, said elongated element having at least one orifice intermediate its extremities and co-alignable with the second passageway in the lock body when the element is disposed in the first passageway, an elongated lock secured in said second passageway of the lock body, said elongated lock including a plunger axially movable in said second passageway from a first position removed from the first passageway, to a second position extending through the first passageway and through said at least one orifice when said element has been disposed in said first passageway and its orifice is aligned with the second passageway; said elongated lock having a key receiving outer extremity and being operated by a key insertable into the last said extremity to move the plunger between its first position and its second position, in which second position the elongated element is prevented from being within said first passageway, and upon turning the key and removing it from the key receiving extremity, the plunger is maintained in its second position, thereby to secure the said elongated element against any movement relative to the lock body.

3. Means for securing two abutting members against movement relative to each other, said means comprising a first rigid plate-like element secured to one of the two said members, and a second rigid plate-like element secured to the other of the two said members, each of said first and second elements being secured to a planar surface on its respective member and configured to define with the planar surface to which each element is secured, an opening, said openings being co-aligned; said elements being disposed adjacent each other; a third rigid plate-like element being secured to of said two members to define a third opening and spaced apart from the other element to which it is secured by predetermined distance;

a solid lock body, said body being defined by two opposite sides formed by parallel faces spaced apart by a distance slightly less than said predetermined distance, and a side wall extending between and around the perimeters of said faces, a first passageway extending through said body between, and normal to, said faces; a second passageway extending in from the body wall to transversely intersect the first passageway to pass therethrough, said lock body being disposed between plate-like elements secured to the same member with its first passageway coaligned in register with said openings, an elongated bar configured to fit closely, but slideably, and in the openings defined by all said three plate-like elements, and in said first passageway in the lock body, said elongated bar having at least one orifice intermediate its extremities and co-alignable in register with the second passageway in the lock body when the bar is disposed in the first passageway, an elongated lock secured in said second passageway of the lock body, said elongated lock including a plunger axially movable in said second passageway from a first position removed from the first passageway, to a second position extending through the first passageway and said at least one orifice when said bar has been disposed in said first passageway and is aligned with the second passageway; said elongated lock having a key receiving outer extremity and being operated by a key Insertable into the last said extremity to move the plunger between its first position and its second position, in which second position the bar is prevented from being moved within said first passageway; and upon turning the key and removing it from the key receiving extremity, the plunger is maintained in its second position, thereby to secure the bar against any movement relative to the lock body, and the abutting members against movement relative to each other.

4. The means for securing two abutting members against relative movement to each other as defined in claim 3, wherein second passageway in the lock body extends for a further distance beyond the first passageway and into the lock body, and the lock plunger, in its second position extends through said first passageway and into the further distance beyond said first passageway and into the lock body.

5. Means for securing two abutting members against movement relative to each other, one of said members comprising a vertical wall, and the other of said members comprising a door which swings about an axis parallel to said wall and in closed position is perpendicular to the wall, said door having a planar surface, said means comprising a first rigid plate-like element secured to the planar surface of the door adjacent an edge thereof, and a second rigid plate-like element also secured to the door and in parallel alignment with the first rigid element; each of said first and second elements being configured to define with the planar door surface to which each element is secured, an opening, said openings being co-aligned; said elements being spaced apart by a predetermined distance; and said wall having an aperture adjacent to said openings and in alignment therewith when the door is in closed position;

a solid lock body, said body being defined by two opposite sides formed by parallel faces spaced apart by a distance slightly less than said predetermined distance, and a side wall extending between and around the perimeters of said faces, a first passageway extending through said body between, and normal to, said faces; a second passageway extending in from the body wall to transversely intersect the first passageway to pass therethrough, said lock body being disposed between said plate-like elements with its first passageway coaligned in register with said openings, an elongated bar configured to fit closely, but slidably, and disposed in said openings and through said first passageway in the lock body to extend into the wall aperture, said elongated bar having at least one orifice intermediate its extremities and co-alignable in register with the second passageway in the lock body when the bar is disposed in the first passageway, an elongated lock secured in said second passageway of the lock body, said elongated lock including a plunger axially movable in said second passageway from a first position removed from the first passageway, to a second position extending through the first passageway and into said at least one orifice when said bar has been disposed in said first passageway with an orifice aligned with the second passageway; said elongated lock having a key receiving outer extremity and being operated by a key insertable into the last said extremity to move the plunger between its first position and its second position, in which second position the bar is prevented from being moved within said first passageway; and upon turning the key and removing it from the key receiving extremity, the plunger is maintained in its second position, thereby to secure the bar against any movement relative to the lock body, and the abutting members against movement relative to each other.

6. Means for securing in a fixed position a control wheel of a pressure valve having a first mounting plate and an axle extending normally from said mounting plate, said axle being capped by the control wheel, said means comprising a locking arrangement as a solid lock body, said body being defined by two opposite sides formed by parallel faces and a side wall extending between and around the perimeters of said faces, a first passageway extending through said body between, and normal to, said faces, a second passageway extending in from the body wall to transversely intersect the first passageway to pass therethrough, one face of said lock body being secured to the mounting plate and an elongated element extending from within said first passageway outwardly to the valve wheel with its end adjacent said wheel being configured to hook over said wheel when the elongated element is secured in the lock body, said elongated element having a transverse orifice, and an elongated lock secured in said second passageway of the lock body, said elongated lock including a plunger axially movable in said second passageway from a first position removed from the first passageway, to a second position extending through the first passageway and through said orifice when said element has been disposed in said first passageway and its orifice is aligned with the second passageway; said elongated lock having a key receiving outer extremity and being operated by a key insertable into the last said extremity to move the plunger between its first position and its second position, in which second position the elongated element is prevented from being moved within said first passageway, and upon turning the key and removing it from the key receiving extremity, the plunger is maintained in its second position, thereby to secure the said elongated element against any movement relative to the lock body.

7. Means for securing two abutting members against movement relative to each other, a first one of said members being a fixed wall and the second of said members being in the form of a door disposable in a first position normal to the first member and pivotable away from said first position to a second position away from said first member, said means comprising a first rigid plate-like element secured to the first member, a second rigid element secured to the second member and a third rigid element also secured to the second member and spaced from the second element by a predetermined distance, each of said first, second and third elements having an opening coaligned with the openings in the other two elements, an elongated bar extendable into all of said openings, a lock body interposed in the space between the second and third elements, said lock body being defined by two opposite sides formed by parallel faces spaced apart by a distance slightly less than the predetermined distance between the second and third elements, and a side wall extending between and around the perimeters of said faces, a first passageway extending through said lock body between, and normal to, said faces; a second passageway extending in from the side wall in the lock body to transversely intersect the first passageway to pass therethrough;

an elongated bar configured to fit closely but slideably, and disposed in the openings in said three rigid elements and in said first passageway in the lock body, said elongated bar having at least one orifice intermediate its extremities and coalignable in register with the second passageway in the lock body when the bar is disposed in the first passageway; and an elongated lock secured in said second passageway of the lock body, said elongated lock including a plunger axially moveable in said second passageway from a first position removed from the first passageway to a second position extending through the first passageway and said at least one orifice, when said bar has been disposed in the first passageway and is aligned with the second passageway; said lock having a key receiving outer extremity and being operated by a key insertable into the last said extremity to move the plunger between its first position and its second position, in which second position the bar is prevented from being moved within said first passageway; and upon turning the key and removing it from the key receiving extremity, the plunger is maintained in its second position, thereby to secure the bar against any movement relative to the lock body and the abutting members against movement relative to each other.

* * * * *